(12) United States Patent
Anguelov et al.

(10) Patent No.: US 8,259,994 B1
(45) Date of Patent: Sep. 4, 2012

(54) USING IMAGE AND LASER CONSTRAINTS TO OBTAIN CONSISTENT AND IMPROVED POSE ESTIMATES IN VEHICLE POSE DATABASES

(75) Inventors: Dragomir Anguelov, San Francisco, CA (US); Christian Frueh, San Francisco, CA (US); Sameer Agarwal, Seattle, WA (US)

(73) Assignee: Google Inc., Mountain View, CA (US)

( * ) Notice: Subject to any disclaimer, the term of this patent is extended or adjusted under 35 U.S.C. 154(b) by 171 days.

(21) Appl. No.: 12/882,063

(22) Filed: Sep. 14, 2010

(51) Int. Cl.
*G06K 9/00* (2006.01)
*G06K 9/46* (2006.01)
*G06F 17/10* (2006.01)

(52) U.S. Cl. ......... 382/100; 382/203; 701/300; 701/400
(58) Field of Classification Search ........... 382/100–322
See application file for complete search history.

(56) References Cited

U.S. PATENT DOCUMENTS

| | | | | |
|---|---|---|---|---|
| 4,305,130 | A * | 12/1981 | Kelley et al. ................... | 700/259 |
| 7,110,569 | B2 * | 9/2006 | Brodsky et al. ................. | 382/103 |
| 7,292,151 | B2 * | 11/2007 | Ferguson et al. ........... | 340/573.1 |
| 7,366,645 | B2 * | 4/2008 | Ben-Arie et al. .................. | 703/6 |
| 7,444,011 | B2 * | 10/2008 | Pan et al. ........................ | 382/131 |
| 7,492,268 | B2 * | 2/2009 | Ferguson et al. ........... | 340/573.1 |
| 7,610,146 | B2 * | 10/2009 | Breed ............................. | 701/514 |
| 7,711,146 | B2 * | 5/2010 | Tu et al. ........................ | 382/103 |
| 7,729,515 | B2 * | 6/2010 | Mandella et al. .............. | 382/106 |
| 7,924,146 | B2 * | 4/2011 | Seder et al. ................... | 340/435 |
| 7,974,443 | B2 * | 7/2011 | Kipman et al. ................ | 382/103 |
| 2003/0012408 | A1 * | 1/2003 | Bouguet et al. ................ | 382/103 |
| 2003/0058341 | A1 * | 3/2003 | Brodsky et al. ................ | 348/169 |
| 2009/0284529 | A1 * | 11/2009 | De Aguiar et al. ............ | 345/420 |
| 2010/0195867 | A1 * | 8/2010 | Kipman et al. ................ | 382/103 |
| 2010/0195869 | A1 * | 8/2010 | Geiss ............................. | 382/103 |
| 2010/0253596 | A1 * | 10/2010 | Szczerba et al. .................. | 345/7 |

OTHER PUBLICATIONS

Agarwal et al., "Building Rome in a Day," ICCV 2009, Kyoto, Japan, 2009, 8 pages.
Snavely et al., "Skeletal Graphs for Efficient Structure from Motion," IEEE Conference on Computer Vision and Pattern Recognition, Anchorage, AK, Jun. 23-28, 2008, 11 pages.

* cited by examiner

*Primary Examiner* — Manav Seth
(74) *Attorney, Agent, or Firm* — Sterne, Kessler, Goldstein & Fox P.L.L.C.

(57) ABSTRACT

A system for pose generation consisting of a trajectory system, a pose generation system, an intersection extractor, an object identifier, a constraint generator, and a posegraph solver. The trajectory system identifies a number of trajectories based on input positional data of a bounded area. The pose generation system generates one or more poses based on the trajectories. The intersection extractor identifies one or more possible intersections in the one or more poses. The object identifier identifies an object pair for each possible intersection that represents two positional points at each possible intersection. The constraint generator computes and applies one or more intersection constraints to generate an energy value for each object pair based on their geometric relationship. The posegraph solver then minimizes a total energy value by modifying one or more poses and then generates an improved set of pose trajectories based on the modified one or more poses. A method of pose generation is also presented.

20 Claims, 12 Drawing Sheets

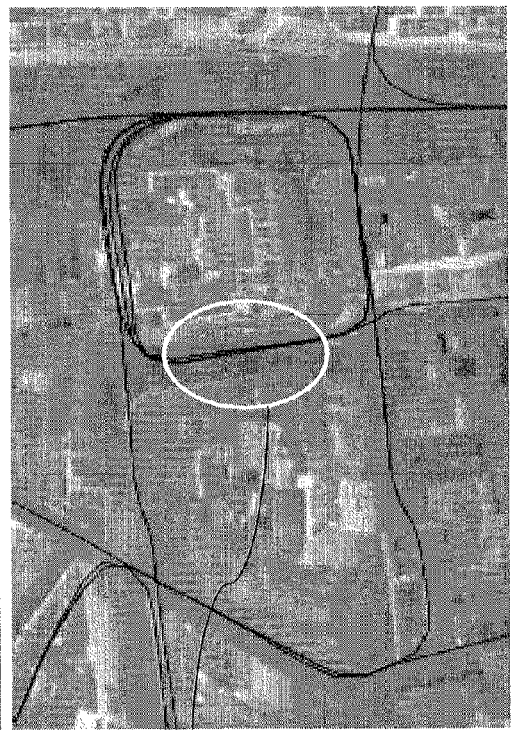
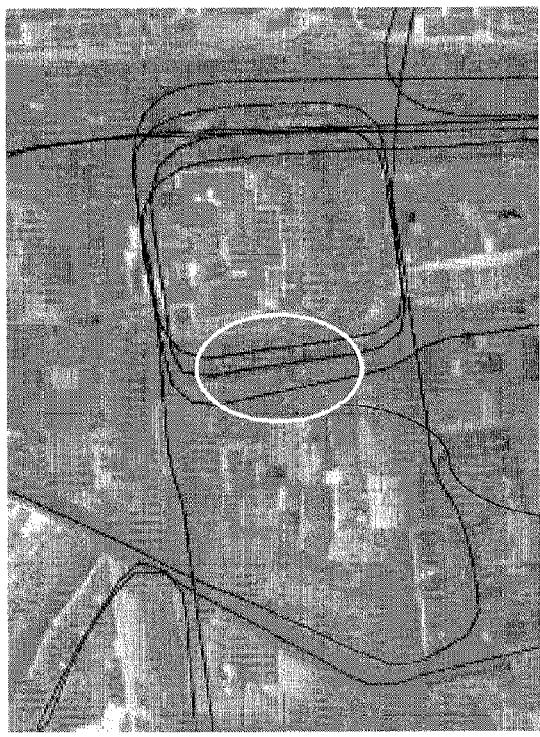
FIG. 9A
FIG. 9B

USING IMAGE AND LASER CONSTRAINTS TO OBTAIN CONSISTENT AND IMPROVED POSE ESTIMATES IN VEHICLE POSE DATABASES

BACKGROUND

1. Field of the Invention

Embodiments of the present invention relate to generating optimized loop-closed pose estimates.

2. Related Art

The use of lasers in robotics became popular in the context of estimating the path of a robot equipped with laser sensors, where detecting that the robot has re-visited a known area can be used to decrease the amount of drift that accumulates during pose estimation. Drift occurs due to measurement errors associated with relative pose sensors, e.g., laser, wheel, odometry, and inertial measurement unit data. Global positioning system (GPS) sensors provide absolute pose information that decreases the amount of drift, but GPS information can be itself very inaccurate or missing, especially in urban canyons. The concept of "loop-closing" occurs where it is determined that the robot is at a location that it previously visited whereby that fact can be used to correct estimated positional data.

In a similar manner, loop-closing has also been accomplished using image data to determine location information, also known as structure-from-motion constraints. The laser sensor described above is replaced by a camera, or set of cameras, whereby location data consists of pictures taken by the cameras and a pose is estimated based on information from the camera images. Another method uses image data to estimate the poses of a set of photographs, possibly geo-located, in an area. By calculating the direction from which a picture is taken and combining many different pictures, a composite rendering of a location, e.g., interior or exterior of a building, can be generated. Representative works of this type of image analysis can be found in, for example, Snavely, Seitz, and Szeliski's, "Skeletal Sets for Efficient Structure from Motion," *Proc. Computer Vision and Pattern Recognition (CVPR)*, 2008, which is an example of generating a structure from motion results for large, unordered, highly redundant, and irregularly sampled photos. An example of a system to match and reconstruct three dimensional scenes from large collections of photographs is further described in, for example, Agarwal, Snavely, Simon, Seitz, and Szeliski's, "Building Rome in a Day," *The Twelfth IEEE International Conference on Computer Vision*, (2009).

Vehicles can be equipped with cameras and lasers in order to obtain data for applications such as map making. However, for the gathered data to be useful, the vehicle pose trajectories, or runs, must be estimated accurately. Current state-of-the-art pose estimation typically uses a global positioning system (GPS), an inertial measurement unit (IMU), and wheel encoder sensors to solve for the vehicle pose. However, GPS signals can be inconsistent as the satellite positions are time dependent and can produce large errors where the satellite signal is reflected off of an obstacle, especially in an urban setting. IMU and wheel encoder sensors also have inherent measurement errors. Therefore, the resulting set of pose trajectories from each type of system can be inconsistent, as well as inconsistent with one another.

What is needed is a method for pose estimation using laser or image constraints to make trajectories consistent at intersections.

BRIEF SUMMARY

The pose estimation problems described above may be addressed by combining multiple trajectories using loop-closing to minimize a total energy value of the constraints. An area to be analyzed is first identified where a number of pose trajectories are identified based on positional input data. The set of trajectories is examined to determine possible intersection points between trajectory pairs or points where pairs or groups of trajectories are in the vicinity of each other, so that laser and/or image data from different trajectories can be aligned. In the rest of the document, the term 'intersection' will denote all such cases. Image and/or laser data is used to calculate accurate alignment constraints between trajectories at such intersections. Each additional constraint is used to define an energy term that represents a desired alignment of a pair or group of trajectories. By minimizing the total energy a more accurate and consistent pose is generated.

According to an embodiment of the present invention, a computer-implemented method for pose generation consists of first identifying a bounded area that is to be analyzed. Positional input data of the bounded area is then obtained from which a number of trajectories are identified. From the trajectories one or more poses are calculated. One or more possible intersections are identified for adjacent pairs or groups of trajectories. At each intersection an object pair is identified that represents two positional points. Intersection constraints are computed and applied to generate an energy value based on the desired geometric relationship of the object pair. The pose is then modified to minimize a total energy value from which modified set of poses are extracted for the given bounded area.

According to another embodiment of the present invention, a system for pose generation consists of a trajectory system, a pose generation system, an intersection extractor, an object identifier, a constraint generator, and a posegraph solver. The trajectory system identifies a number of trajectories based on input positional data of a bounded area. The pose generation system generates one or more poses based on the trajectories. The intersection extractor identifies one or more possible intersections in the one or more poses. The object identifier identifies an object pair for each possible intersection that represents two positional points at each possible intersection. The constraint generator computes and applies one or more intersection constraints to generate an energy value for each object pair based on their geometric relationship. The posegraph solver minimizes a total energy value including all of the individual energy values associated with each object pair by modifying one or more poses.

Further embodiments and features, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments of the invention will now be described, by way of example only, with reference to the accompanying drawings in which corresponding reference symbols indicate corresponding parts. Further, the accompanying drawings, which are incorporated herein and form part of the specification, illustrate the embodiments of present invention and, together with the description, further serve to explain the principles of the invention and to enable a person skilled in the relevant art(s) to make and use the invention.

FIGS. 9A and 9B illustrate posegraphs with original and modified poses according to an embodiment of the present invention.

Figure 1:
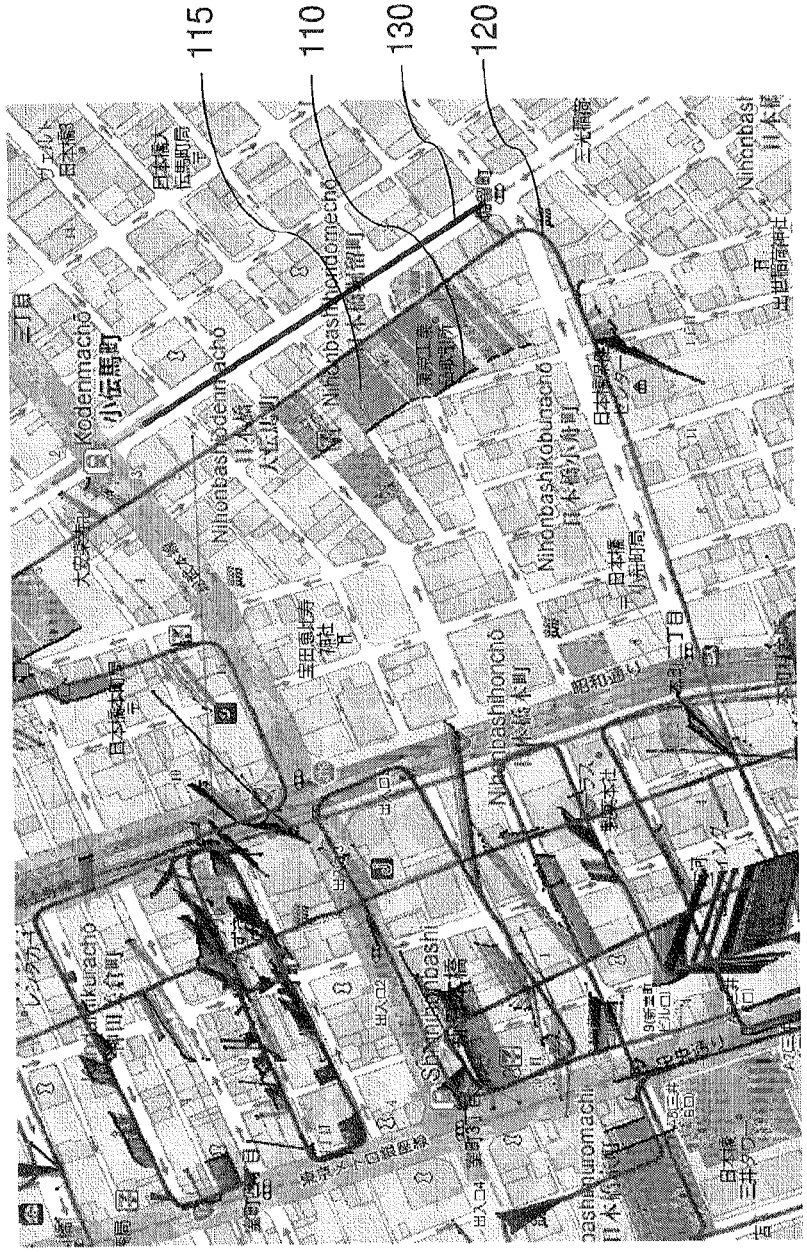
FIG. 1 illustrates a posegraph based on GPS data according to an embodiment of the present invention.

The features of various embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

I. POSE ESTIMATES

FIG. 1 illustrates an estimated pose overlaid on a city map based on pose generation system 100, according to an embodiment of the present invention. In the example shown in FIG. 1, pose generation system 100 includes global positioning system (GPS) position 110, GPS association bars 115, estimated road pose 120, and the actual road segment 130.

Pose generation system 100 illustrates how error prone a pose estimate can be when based only on GPS data. The GPS data is obtained by traveling through the city, e.g., in a vehicle, where the coordinates delivered by a GPS system are recorded and then charted to indicate the overall trajectory, or run, of the vehicle. In this case the vehicle traveled along road segment 130. However, due to obstructions, or other factors, the GPS system indicated that the position of the traveling vehicle was not on road segment 130 but actually at GPS position 110. Of note, GPS position 110 is in the middle of a building. However, pose 120, in an embodiment, is computed using multiple sources of data other than just GPS, e.g., IMU, wheel encoder, visual or laser-based odometry.

Estimated road pose 120 is a smooth path based on GPS position 110 that includes points where GPS readings are associated with the estimated road pose 120 and shown by GPS association bars 115. The resulting computed estimated road pose 120 does indicate a smooth line of travel. However, estimated road pose 120 appears to be through the middle of city blocks versus being on top of the actual road segment 130, showing an example of how estimated pose based only on GPS data can be fairly inaccurate.

Figure 2:
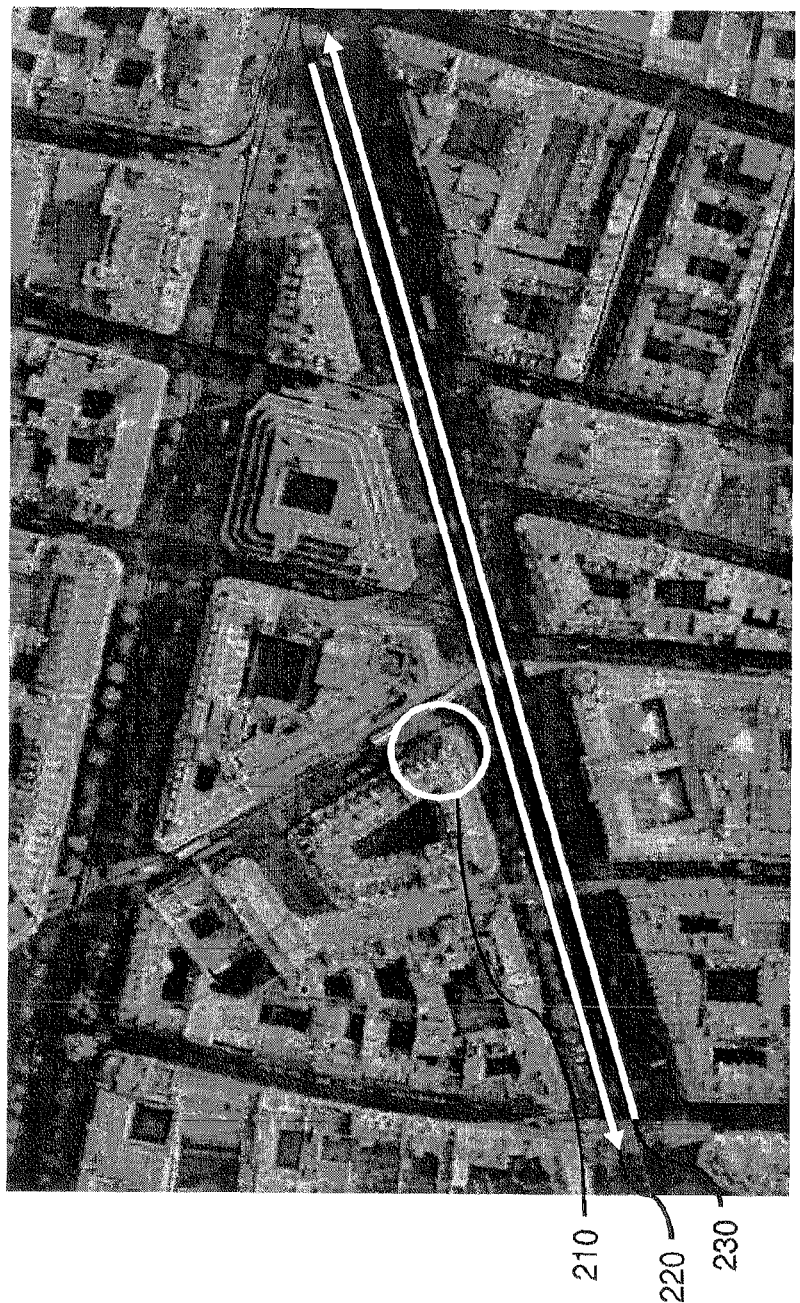
FIG. 2 is an aerial map illustrating trajectories and a target building according to an embodiment of the present invention.

FIG. 2 illustrates an aerial representation 200 of a number of city blocks, according to an embodiment of the present invention. In the example shown in FIG. 2, aerial representation 200 illustrates a street on which a vehicle, for example, could travel along trajectory 220 and 230 in order to obtain data, such as an image, of building 210. Such an image could be used to reconstruct building facades that could be seen along a trajectory.

However, while one could obtain an image of building 210, due to GPS errors as previously discussed or due to the position differences between trajectory 220 and 230, the estimated pose of building 210 may include some positional error.

Figure 3:
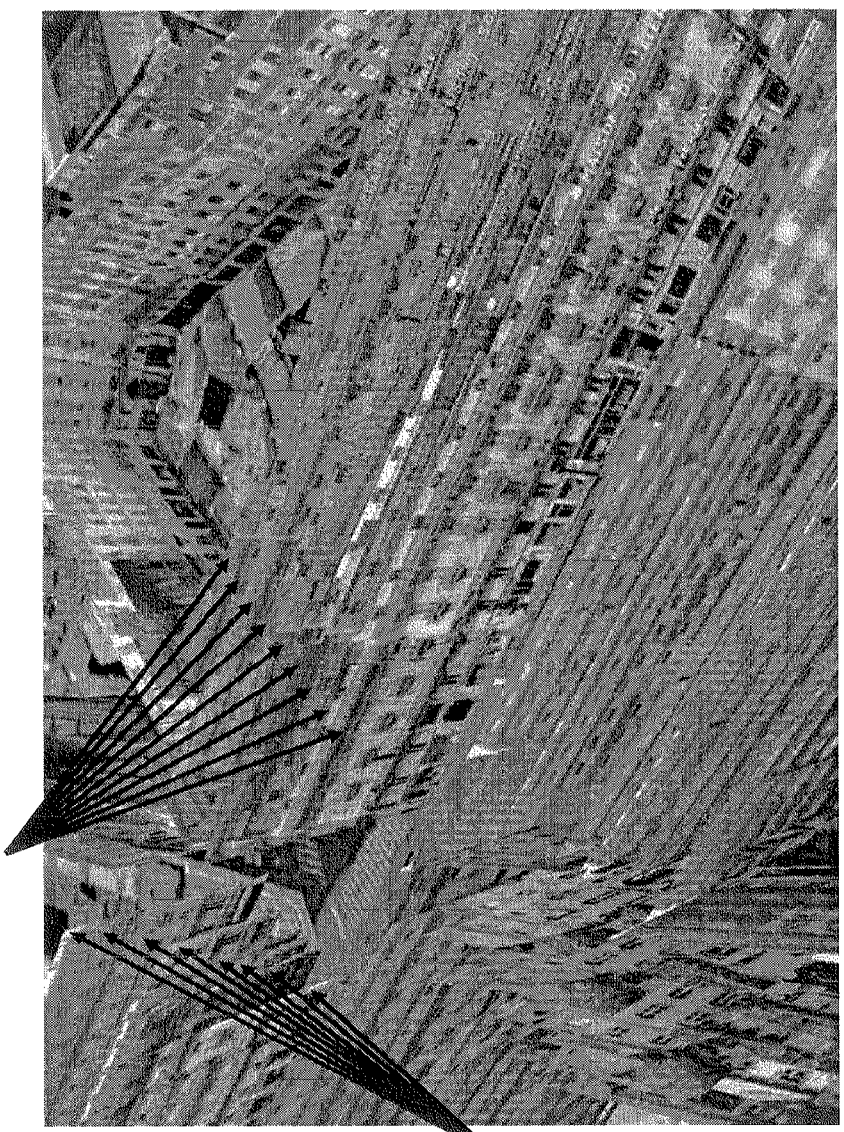
FIG. 3 illustrates building façades generated from multiple passes without pose correction according to an embodiment of the present invention.

FIG. 3 illustrates a reconstructed set of building facades 300, according to an embodiment of the present invention. In the example should in FIG. 3 multiple versions of building façade 310 and 330 are shown.

As discussed in FIGS. 1 and 2 there is inherent error in using a GPS system to obtain precise positional data to estimate an accurate pose. FIG. 3 is an example of using multiple runs or trajectories to capture the images of a building façade with some amount of positional error. The result is that instead of a single building façade there are multiple facades, each slightly displaced due to the positional error as shown by facades 310 and 320.

Figure 4:
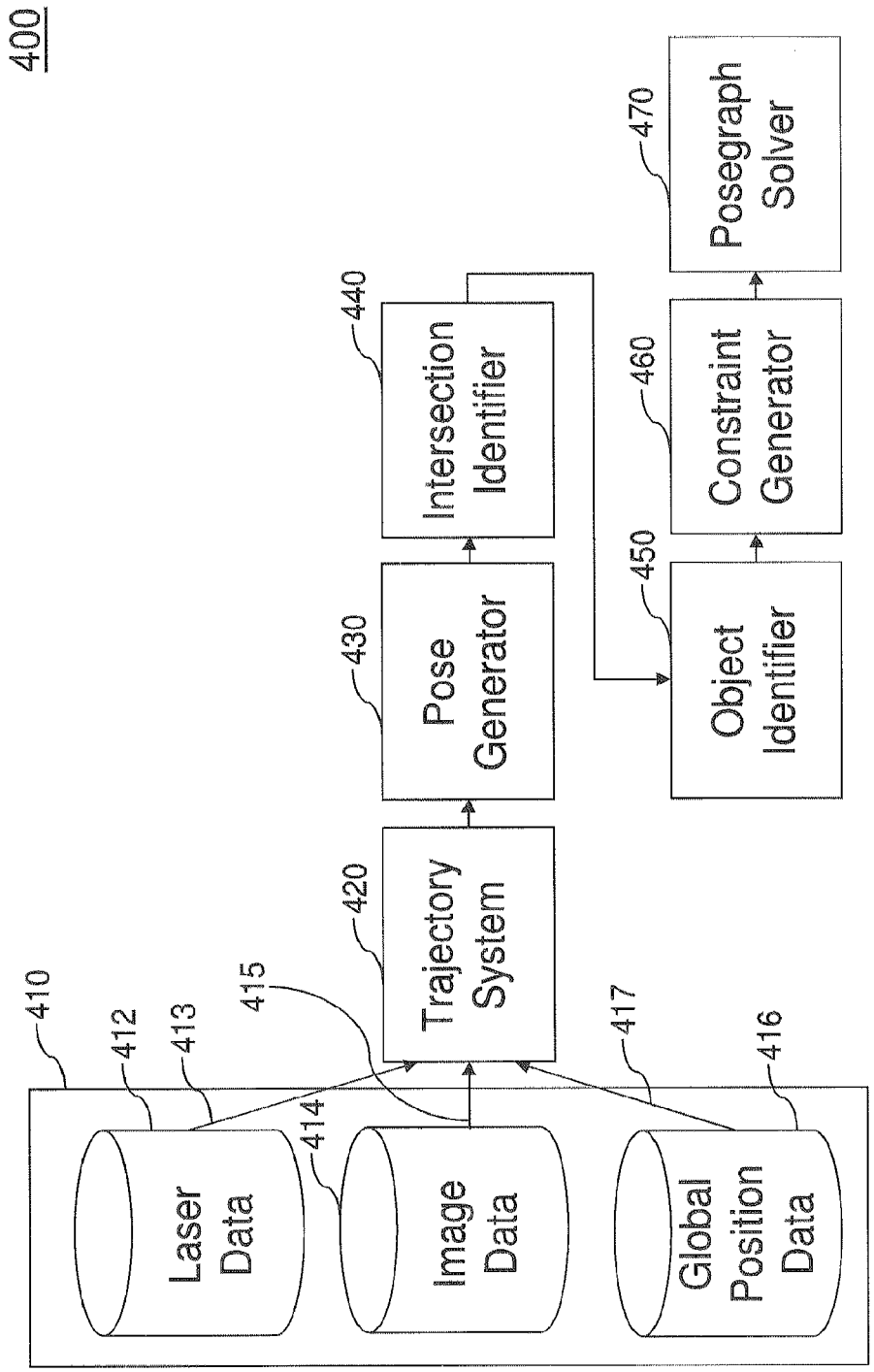
FIG. 4 illustrates a system for pose generation according to an embodiment of the present invention.

FIG. 4 is an illustration of a pose generation system 400, according to an embodiment of the present invention. In the example shown in FIG. 4, pose generation system 400 consists of positional input data system 410, trajectory system 420, pose generator 430, intersection identifier 440, object identifier 450, constraint generator 460, and posegraph solver 470. Further, positional input data system 410 also consists of laser data 412, image data 414, and global position data 416.

Pose generation system 400 may be implemented on any type of computing device. Such a computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory, and graphical user interface display. The computing device may also have multiple processors and multiple shared or separate memory components. For example, the computing device may be a clustered computing environment or server farm.

Data in input data system 410 can represent any amount of area including cities, countries, or entire continents. This data is illustrated as being stored in one or more of laser data 412, image data 414, and global position data 416, but can be stored in any other applicable type format or system. Such data can be stored or accessed via a network, the internet, or other applicable communications network.

Trajectory system 420 receives data from input data system 410 that represents a bounded area to be analyzed in which loopclosing is applied where pose trajectories are made consistent at identified intersections. Such loopclosing analysis can be done for any bounded area including a portion of a city, an entire city, county, state, country, or one or more continents. Further, the bounded area can be identified based on coordinates, e.g., latitude and longitude, or by file type, e.g., KMZ. Once the bounded area to be loopclosed is specified, trajectory system 420 identifies trajectories in the specified area in laser data 412, image data 414, and global position data 416. Each trajectory consists of a path, or run, typically accomplished using a vehicle traversing a set of roads. Trajectory system 420 also partitions the trajectories in the loopclosed area into a set of tractable areas that can, for example, be analyzed efficiently in parallel, e.g., by using a map-reduce framework. Such tractable areas are considered to be contiguous areas of a threshold size, e.g., 100 to 100,000 square kilometers.

Trajectory system 420 identifies loopclosed trajectories within each tractable area. Pose generator 430 converts the trajectories identified by trajectory system 420 into a series of one or more pose trajectories that can be graphically illustrated and overlaid, e.g., a posegraph, for example, on a map of an area to indicate a route traveled by a vehicle. In this context, a posegraph is a graph of all trajectories in an area, augmented with computed intersection constraints.

Figure 5:
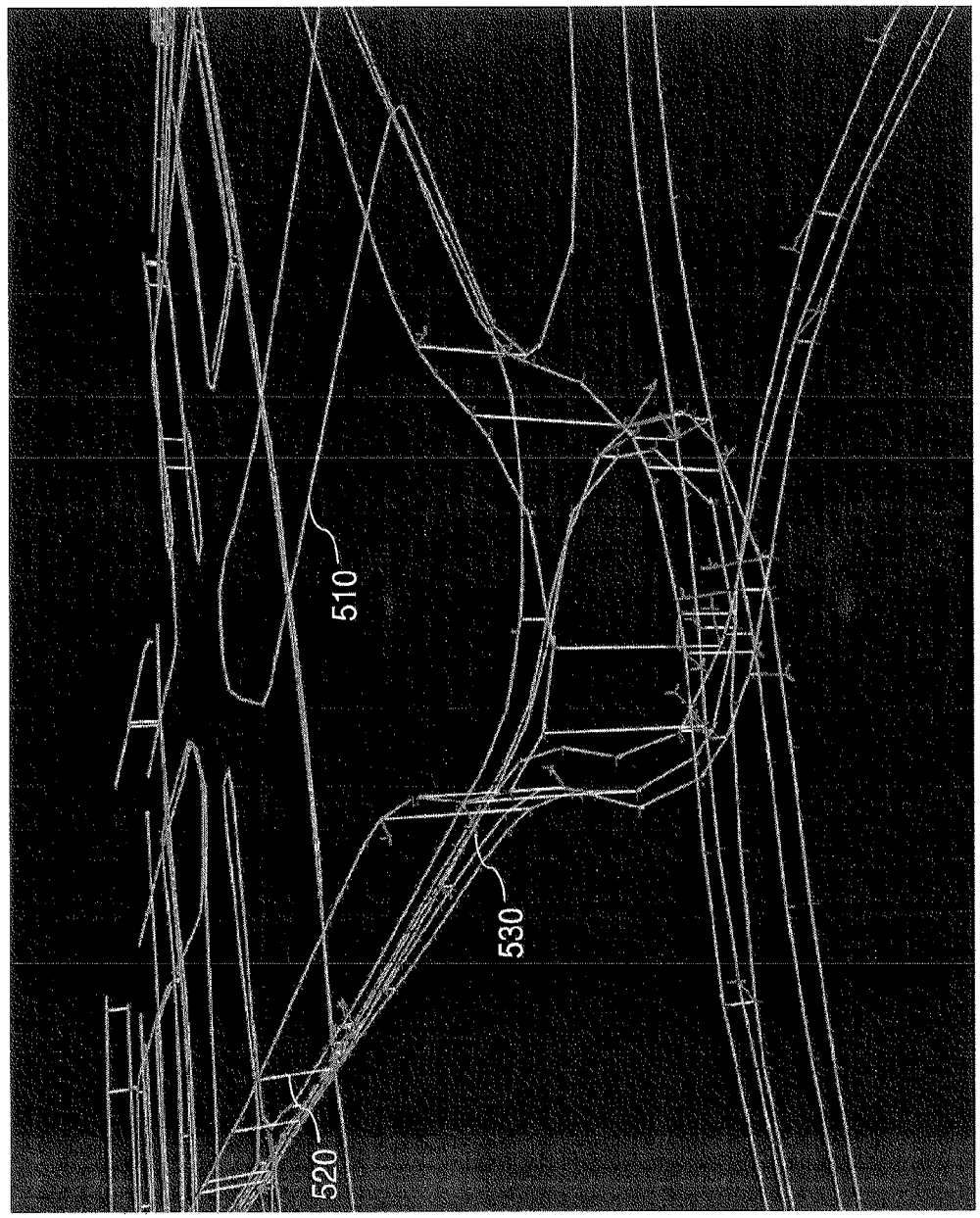
FIG. 5 illustrates a posegraph with constraints according to an embodiment of the present invention.

FIG. 5 is an illustration of a posegraph 500, according to an embodiment of the present invention. In the example shown in FIG. 5, posegraph 500 consists of multiple pose trajectories, such as pose trajectory 510. Posegraph 500 also illustrates intersection constraint 520 and pose correction vector 530 that will be discussed later.

II. INTERSECTION IDENTIFICATION

Referring back to FIG. 4, intersection identifier 440 accepts as an input the pose trajectories generated by pose generator 430. In order to generate more accurate pose estimates, identification of intersection points are used to produce overlapping geographic points on one or more pose trajectories. Intersection identifier 440 identifies potential intersection hypotheses where an intersection is a place where two pose trajectories, or two parts of the same pose trajectory separated by a sufficient amount of time, are close enough so that the associated data can be used to obtain a geometric relationship between the trajectories. The associated data can consist of a combination of laser data 412, image data 414, and global position data 416. An example of a geometric relationship between two trajectories is shown, for example, as intersection constraint 520 in FIG. 5.

Intersection identifier 440 can use several methods to identify possible intersection hypotheses. As an example, in an embodiment, a pose is analyzed to identify where pose trajectory estimates intersect. In another embodiment, the posegraph is divided into regions, and for each pair of pose trajectories in the region, a hypothesis is generated at the point the two pose trajectories are nearest to each other and closer than a threshold value. The use of a threshold value to determine a possible intersection allows the quantity of identified possible intersections to vary by changing the threshold value. In this manner, imperfect pose trajectory estimates can be used. As an example, imperfect pose trajectories based on global position data 416 are typically less than 50 meters away from the correct position and while the data is imperfect the identification of an intersection is still possible based on varying the threshold value.

Object identifier 450 accepts as an input the identified possible intersection hypotheses in order to generate a pair of positional objects, one from each pose trajectory, close to the identified intersection hypotheses that represent two object points that are the most likely to be from the same area. The identified intersection hypothesis will be further refined to obtain an accurate intersection constraint between two pose trajectories by using data from data input system 410.

III. IMAGE CONSTRAINTS

Figure 6:
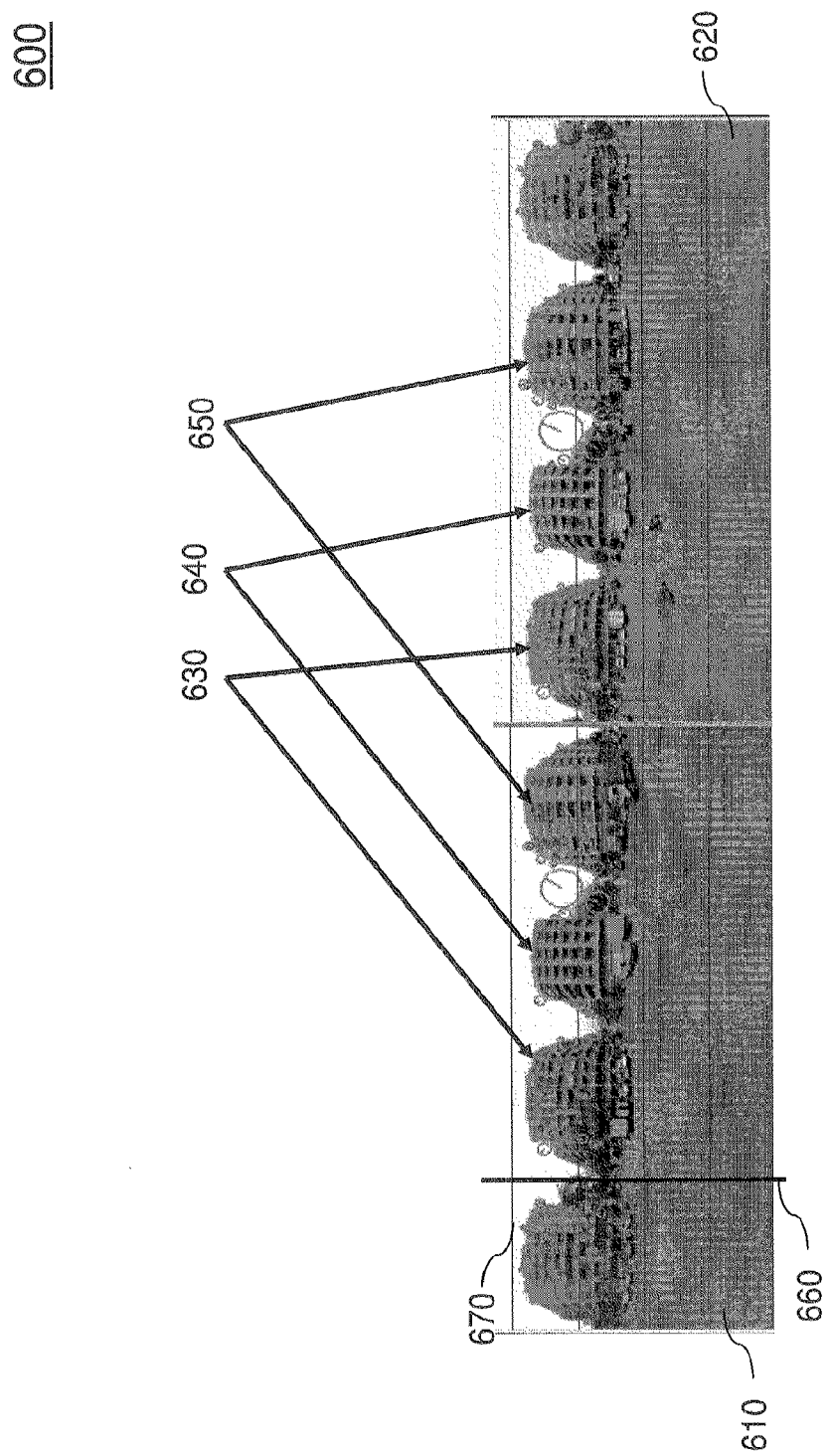
FIG. 6 illustrates vision constraints according to an embodiment of the present invention.

Constraint generator 460 uses data from positional input data system 410 to generate constraints based on one or more of image data, laser data, and global position data. FIG. 6 is an illustration of image-based constraint 600, according to an embodiment of the present invention. In the example shown in FIG. 6, an image-based constraint 600 consists of a spherical panorama 610 and spherical panorama 620. Both spherical panorama 610 and spherical panorama 620 include identified buildings 630, 640, and 650, offset indicator 660, and height indicator 670. Panorama 610 was captured at a different time or from a different trajectory than that of panorama 620. As an example, panoramas 610 and 620 are associated with two different pose trajectories where a possible intersection hypothesis has been identified. Each panorama covers an area around the intersection hypothesis, e.g., approximately a 50×50 meter area, where the goal is to determine if the panoramas are indeed taken from the same area. This determination is accomplished by computing all pairwise image matches identified in object identifier 450 in panorama 610 and panorama 620 and identify the pair that is most likely to be from the same image area. Such an identification is highly efficient for spherical images as the problem is reduced to finding an unknown offset along the x-dimension while matching scale-invariant feature transform (SIFT) like features from panorama 610 and panorama 620. FIG. 6 illustrates such features, for example buildings 630, 640, and 650 exist in both panoramas 610 and 620. However, the buildings in panorama 620 are offset by one building with respect to panorama 610. This offset is indicated by offset indicator 660. Further, the analysis can be solved by the use of a one-dimensional search, e.g., 1D RANSAC, where each potential feature match suggests a particular x-offset. The possible intersection is considered valid if there is a large enough, e.g., greater than a specified threshold, geometrically consistent set of feature matches between the images in each panorama. The image-based constraint specifies that the two trajectories cross at the point where the two panoramas overlap, and at an angle corresponding to the offset in the x-dimension that was computed.

Three-dimensional image constraints can also be used to validate a potential intersection hypothesis. Such constraints can be obtained by matching, for example image panorama for two trajectories, or a single trajectory where there is a time difference in when the images were captured. Other embodiments can be based on a single image or a group of images using an area, e.g., 50×50 meters, around a corresponding potential intersection hypothesis. Using structure-from-motion methods, the panorama, or image, pairs from the trajectories are matched. For each match, a 5 or 7 point RANSAC iterative method is used on the SIFT-like features in the panoramas to obtain the epipolar constraint (e.g., rotation and translation up to scale). The epipolar constraint can be directly introduced into the optimization, or it can be further refined to obtain a full rigid three-dimensional constraint. Such a full rigid three-dimensional constraint can be determined by using the images and other positional information, for example laser data 412, from a given sequence to estimate the three-dimensional points corresponding to the image features in that sequence. The three-dimensional rigid constraint can be solved thus describing how an image in a second sequence is positioned relative to the feature points and the three-dimensional points reconstructed from the first sequence. Such a solution can be accomplished using a 3-point RANSAC method for calibrated cameras, or a 4-point RANSAC method for cameras with unknown focal length. A three-dimensional image intersection constraint is considered valid if there are a sufficient number of feature matches that remain after the RANSAC filtering steps; otherwise the constraint is considered an outlier and does not participate in subsequent optimization.

Figure 7:
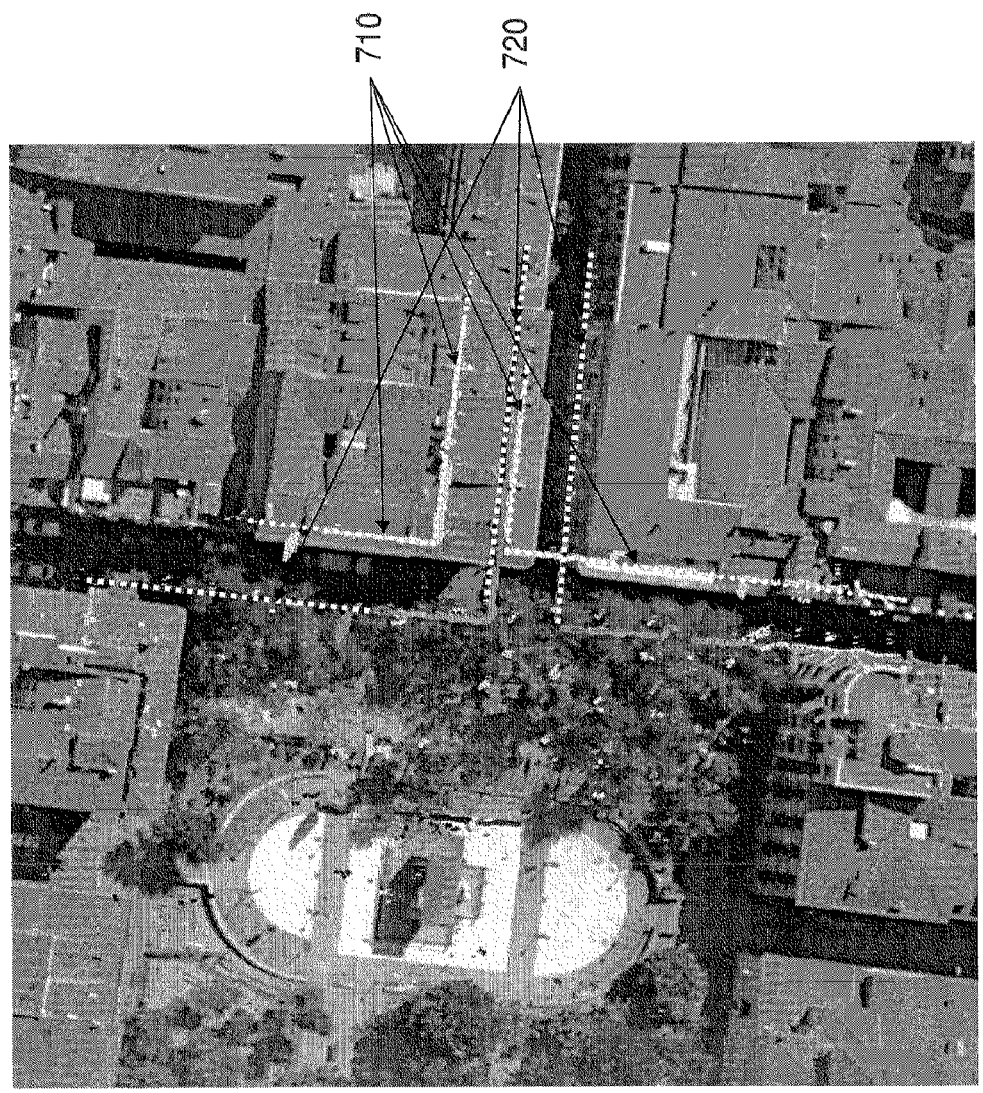
FIG. 7 illustrates laser constraints according to an embodiment of the present invention.

FIG. 7 illustrates laser based constraint system 700 that includes the use of a laser to generate laser based constraints, according to an embodiment of the present invention. FIG. 7 includes laser scans 710 and 720 representing two different trajectories that were generated by the use of a laser, e.g., vehicle mounted laser. Laser based constraints are then obtained by means of scan matching. As discussed above, an intersection hypothesis is identified and the corresponding laser scan points are associated for each of the trajectory points or trajectory line segments. Once identified, the relative pose (e.g., translation and rotation) of each set of points, or segments, are adjusted through scan matching such that the multiple trajectories are best aligned with each other.

The alignment of the laser scan points, or segments, from multiple trajectories can be accomplished by any method of scan matching, either two-dimensional or three-dimensional. For example, iterative closest point (ICP), point-to-point, or matching based on extracted features such as lines or surfaces, or features-to-points can be used. The associated quality metric of the scan matching can be based on a least square or robust least square function of the point-to-point or feature distances. The obtained relative pose and/or associated confidence measure is then used as a constraint for the subsequent global pose optimization.

Figure 8:
FIG. 8 illustrates laser constraints according to an embodiment of the present invention.

In an embodiment, the laser based scan matching includes a quality based threshold whereby if a laser based scan does not align with other scans and there is greater than a threshold amount of difference, then the scan is considered to be an outlier and is removed. Once removed the scan is no longer part of the overall scan matching process. In another embodiment, the laser based scan matching includes a second quality based threshold whereby the best scan alignment hypothesis is compared to the next best scan alignment hypotheses. The best scan alignment hypothesis generates an intersection constraint only if the quality score difference, or ratio, between the two exceeds a predefined threshold. Otherwise it is discarded as being an outlier. FIG. 8 illustrates laser based constraint system 800 where laser scans 710 and 720 representing two different trajectories are scan matched as described above, resulting in laser pose estimate 810.

IV. OPTIMIZATION

In an embodiment, rather than matching individual scans, several scans within a trajectory interval can be combined into a larger composite, i.e., superscan, by using the relative poses of the initial trajectories. Then, for example, two superscans can be created, one for each subsequence using the original trajectories. A coarse sampling of the space of possible superscan alignments is then performed and refined by retaining the highest scoring coarse alignments.

In another embodiment, in order to avoid local minima, several, e.g., random or systematic, different relative starting poses are used for initializing the scan matching. The scan matching result with the highest quality metric is used as the result of the matching.

In another embodiment, the accuracy of the confidence estimate for the scan matching is enhanced by analysis of a quality metric. If the quality of the best scan matching result is lower than a threshold, then the confidence in the match is low. In another example, if the second derivative of the quality function around the best scan matching result is lower than a threshold, the confidence in the match is low. In yet another example, if the quality of the best scan matching result differs less than a threshold from another local maximum, the confidence in the match is low.

The speed of scan matching can be improved by subdividing scans or features of each superscan into geo-spatial cells. When such a subdividing is performed only the contents of each cell need to be scan matched; the resulting final match is then determined based on optimizing the sum of the quality metrics of all sub-cells, or by performing scan matching for all sub-cells individually and computing a final match using average or consensus over individual cell results. Further, the optimizing scenarios described above can be combined in various ways to obtain intersection constraints that are not outliers with a higher confidence factor.

In another embodiment, the original trajectories that are typically stored at a high rate are subsampled at a lower rate to obtain a compact trajectory representation. The subsampled set contains all poses that are associated with valid refined intersection constraints, with additional poses chosen to guarantee that the trajectories are sampled at a particular resolution.

V. POSEGRAPH RELAXATION

Returning to FIG. 4, posegraph solver 470 accepts as input a non-optimized posegraph including identified possible intersections and various constraints and solves the posegraph using posegraph relaxation. FIGS. 9A and 9B illustrate a posegraph solver system 900, according to an embodiment of the present invention. FIG. 9A represents a two dimensional posegraph prior to optimization while FIG. 9B represents the same two dimensional posegraph after relaxation and optimization, each posegraph being superimposed upon a map showing buildings surrounded by roadways. As previously mentioned, loopclosing is the process used to minimize the energy value of the posegraph constraints. For example, posegraph 9A consists of the set of all subsampled poses in an area including the definition of several types of pose constraints, whose attributes are preserved as much as possible in a final solution. Each constraint has one or more energy teams associated with it that represents a deviation from another factor as further described below.

Relative constraints are those constraints that attempt to preserve the relative position and orientation of consecutive pose samples in the original trajectories. Relative poses appear to be fairly accurate.

Global Positioning System (GPS) constraints are those constraints based on readings from a GPS that attempt to preserve the original trajectory locations. Posegraph relaxation does not typically strongly enforce a GPS constraint as global trajectory poses based on GPS data tend not to be very accurate.

Gravity constraints are those constraints that attempt to preserve the direction of gravity. A gravity constraint is very accurate from the original trajectory, if an IMU sensor input was used to compute the original trajectory.

Odometry constraints are those constraints that attempt to preserve wheel odometry information. Odometry constraints are somewhat accurate.

Intersection constraints, as discussed above, introduce relationships between pairs of trajectories, or two different parts of the same trajectory. The terms modeling intersection constraints may need to be defined using a robust energy function, which can deal with occasional incorrect intersection constraints that may have been estimated.

The goal of posegraph relaxation, or optimization, is to identify the joint solution that minimizes the error associated with the above constraints, e.g., relative, GPS, gravity, odometry, and intersection. Such a problem can be solved using algorithms such as conjugate gradient descent, or a Levenberg-Marquardt local search method, which utilizes a sparse Cholesky matrix solver. Additional solvers are also possible. FIG. 9B shows the results of such an optimization where the area within section 910 clearly shows three separate trajectories along a single road prior to relaxation. After relaxation, optimization, the same area is shown in section 920 that illustrates a single trajectory located within the road.

Figure 10B:
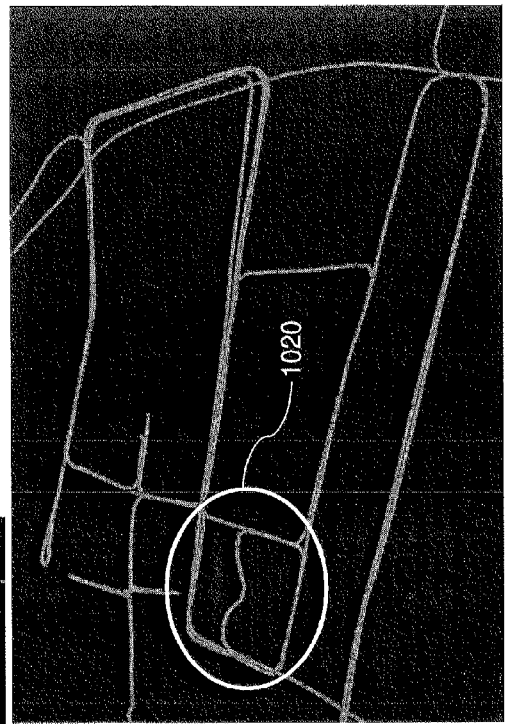
FIGS. 10A and 10B illustrate 3D posegraphs with original and modified poses according to an embodiment of the present invention.
Figure 10A:
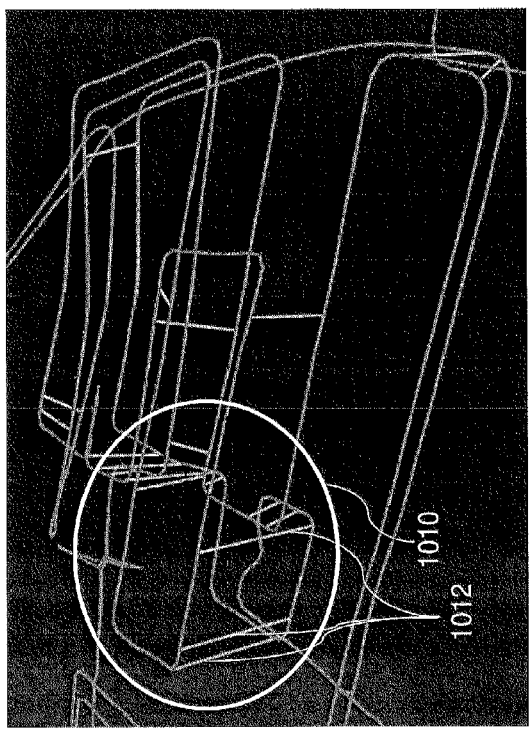

FIGS. 10A and 10B illustrate a posegraph solver system 1000, according to an embodiment of the present invention. FIG. 10A represents a three-dimensional posegraph prior to optimization while FIG. 10B represents the same three-dimensional posegraph after optimization. Section 1010 of FIG. 10a illustrates the separation of various posegraph trajectories linked by constraints, such as constraints 1012. Optimization of the posegraph of FIG. 10A reduces the energy, shown by the length of constraints 1012, so that the various posegraphs are better aligned as shown by section 1020 in FIG. 10B.

In an embodiment, the sparse Cholesky solver is not able to handle situations when the posegraph size and the number of intersections constraints grow very large, e.g., area being analyzed exceeds 10 square kilometers. In such situations a parallel implementation can be utilized where:

A large posegraph is partitioned into a disjoint set of smaller posegraphs,

A solution is obtained for each posegraph in parallel while keeping the nodes at the boundary of two or more posegraphs constant, and/or If significant changes in pose estimates occur then obtain a different partition of the posegraph and repeat the above step.

In an embodiment, for each pose trajectory in an area, the optimized solution provides a set of sparse pose estimates. The original set of high-frequency pose samples are deformed to agree with the sparse set of poses. This approach assumes the subsampled poses are correct and spreads the rotational and translational residual evenly across the intermediate poses. The result produces an exact solution if rotational error terms dominate the translation error terms, otherwise the approach generates a close approximation. This approach allows for a quicker optimization using the smaller set of sparse pose estimates while retaining the detail associated with the high-frequency pose, thus preserving all relative local pose transformations, but agreeing with the posegraph relaxation refinements.

VI. METHOD

Figure 11:
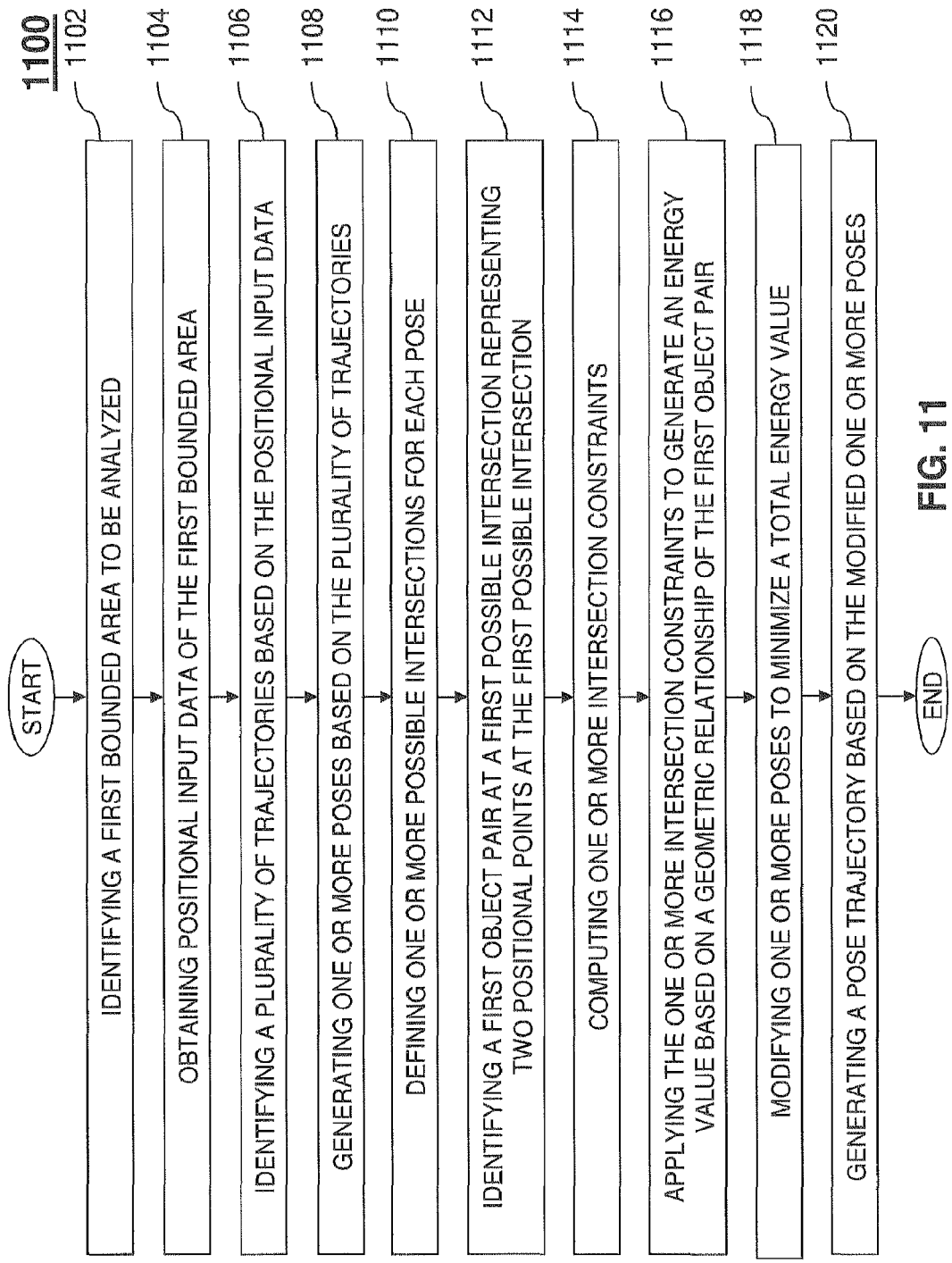
FIG. 11 illustrates a method for improving pose, which uses loop-closing according to an embodiment of the present invention.

FIG. 11 illustrates method 1100 for pose generation, according to an embodiment of the present invention. In the example shown in FIG. 11, the method starts with step 1102 that includes identifying a first bounded area to be analyzed. Step 1104 continues by obtaining positional input data of the first bounded area. Step 1106 continues by identifying a plurality of trajectories based on the positional input data. Step 1108 generates one or more poses based on the plurality of trajectories. Step 1110 defines one or more possible intersections for each pose. Step 1112 identifies a first object pair at a first possible intersection that represents two positional points at the first possible intersection. Step 1114 continues by computing one or more intersection constraints. Step 1116 applies the one or more intersection constraints to generate an energy value based on a geometric relationship of the first object pair. Step 1118 modifies one or more poses in the posegraph to minimize a total energy value. Step 1120 concludes with the generation of high frequency pose trajectories based on the modified one or more poses.

VII. EXAMPLE COMPUTER SYSTEM IMPLEMENTATION

Aspects of the present invention shown in FIGS. 1-11, or any part(s) or function(s) thereof, may be implemented using hardware, software modules, firmware, tangible computer readable media having instructions stored thereon, or a combination thereof and may be implemented in one or more computer systems or other processing systems.

Figure 12:
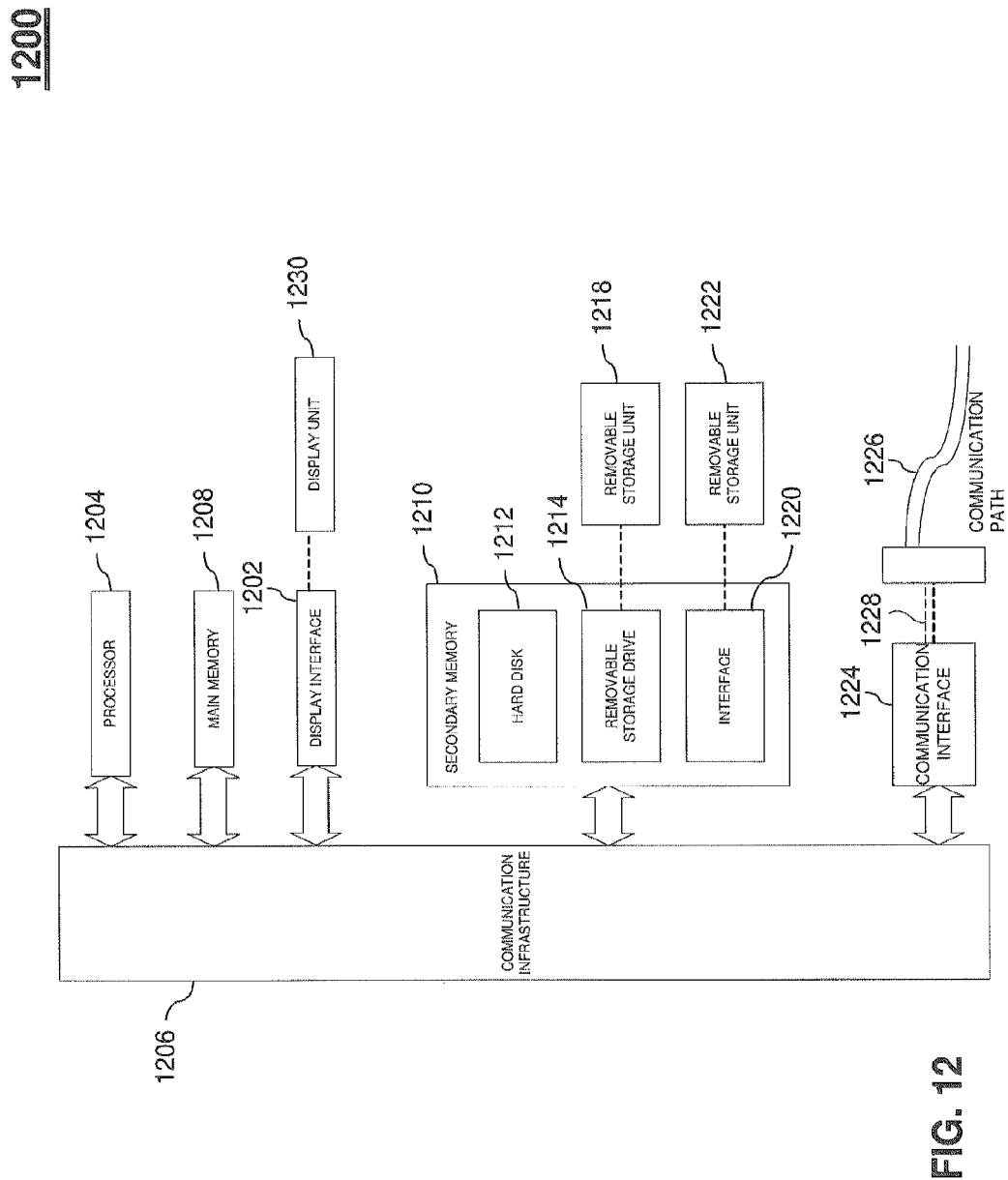
FIG. 12 illustrates a computer system that improves pose using loop-closing according to an embodiment of the present invention.

FIG. 12 illustrates an example computer system 1200 in which embodiments of the present invention, or portions thereof, may by implemented as computer-readable code. For example, pose generation system 400, may be implemented in computer system 1200 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-11.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in teams of this example computer system 1200. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1204 may be a special purpose or a general purpose processor device. As will be appreciated by persons skilled in the relevant art, processor device 1204 may also be a single processor in a multi-core/multiprocessor system, such system operating alone, or in a cluster of computing devices operating in a cluster or server farm. Processor device 1204 is connected to a communication infrastructure 1206, for example, a bus, message queue, network, or multi-core message-passing scheme.

Computer system 1200 also includes a main memory 1208, for example, random access memory (RAM), and may also include a secondary memory 1210. Secondary memory 1210 may include, for example, a hard disk drive 1212, removable storage drive 1214. Removable storage drive 1214 may comprise a floppy disk drive, a magnetic tape drive, an optical disk drive, a flash memory, or the like. The removable storage drive 1214 reads from and/or writes to a removable storage unit 1218 in a well known manner. Removable storage unit 1218 may comprise a floppy disk, magnetic tape, optical disk, etc. which is read by and written to by removable storage drive 1214. As will be appreciated by persons skilled in the relevant art, removable storage unit 1218 includes a computer usable storage medium having stored therein computer software and/or data.

Computer system 1200 (optionally) includes a display interface 1202 (which can include input/output devices such as keyboards, mice, etc.) that forwards graphics, text, and other data from communication infrastructure 1206 (or from a frame buffer not shown) for display on display unit 1230.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 may be in the form of signals, which may be electronic, electromagnetic, optical, or other signals capable of being received by communications interface 1224. These signals may be provided to communications interface 1224 via a communications path 1226. Communications path 1226 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, and a hard disk installed in hard disk drive 1212. Computer program medium and computer usable medium may also refer to memories, such as main memory 1208 and secondary memory 1210, which may be memory semiconductors (e.g. DRAMs, etc.).

Computer programs (also called computer control logic) are stored in main memory 1208 and/or secondary memory 1210. Computer programs may also be received via communications interface 1224. Such computer programs, when executed, enable computer system 1200 to implement the present invention as discussed herein. In particular, the computer programs, when executed, enable processor device 1204 to implement the processes of the present invention, such as the stages in the method illustrated by flowchart 1100 of FIG. 11 discussed above. Accordingly, such computer programs represent controllers of the computer system 1200. Where the invention is implemented using software, the software may be stored in a computer program product and loaded into computer system 1200 using removable storage drive 1214, interface 1220, and hard disk drive 1212, or communications interface 1224.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

VIII. CONCLUSION

Embodiments described herein provide methods and apparatus for the generation and optimization of images using constraints. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method for pose generation comprising:
   identifying a first bounded area to be analyzed;
   obtaining positional input data of the first bounded area;
   identifying a plurality of trajectories based on the positional input data;
   generating one or more poses based on the plurality of trajectories;
   defining one or more possible intersections for each pose;
   identifying a first object pair at a first possible intersection representing two positional points at the first possible intersection;
   computing one or more intersection constraints;
   applying the one or more intersection constraints to generate an energy value based on a geometric relationship of the first object pair; and
   modifying the one or more poses to minimize a total energy value.

2. The method of claim 1, further comprising generating an improved set of pose trajectories based on the modified one or more poses.

3. The method of claim 1, wherein one of the one or more intersection constraints is based on vision sensor data.

4. The method of claim 1, wherein one of the one or more intersection constraints is based on laser sensor data.

5. The method of claim 1, wherein one of the one or more intersection constraints is based on global positioning system data.

6. The method of claim 1, wherein one of the one or more intersection constraints is based on odometry data.

7. The method of claim 1, further comprising:
   identifying a second object pair at a second possible intersection representing two positional points at the second possible intersection; and
   applying the one or more intersection constraints to generate an energy value based on a geometric relationship of the second object pair.

8. The method of claim 1, further comprising:
   identifying a second bounded area to be analyzed; and
   obtaining positional input data of the second bounded area, wherein identified trajectories in the first and second bounded areas are non-overlapping.

9. The method of claim 8, further comprising:
   identifying a third bounded area to be analyzed; and
   obtaining positional input data of the second bounded area, wherein identified trajectories in the first, second, and third bounded areas are non-overlapping, and wherein the third bounded area is not adjacent to the first bounded area.

10. The method of claim 1, wherein the obtaining positional input data is based on the use of a vehicle.

11. A system for pose generation comprising:
    a trajectory system configured to identify a plurality of trajectories based on the positional input data of a first bounded area;
    a pose generation system configured to generate one or more poses based on the plurality of trajectories;
    an intersection extractor configured to identify one or more possible intersections in the one or more poses;
    an object identifier configured to identify a first object pair at a first possible intersection representing two positional points at the first possible intersection;
    a constraint generator configured to compute one or more intersection constraints and apply the one or more intersection constraints to generate an energy value based on a geometric relationship of the first object pair; and
    a posegraph solver configured to minimize a total energy value by modifying the one or more poses.

12. The system of claim 11, wherein the posegraph solver generates an improved set of pose trajectories based on the modified one or more poses.

13. The system of claim 11, wherein one of the one or more intersection constraints is based on vision sensor data.

14. The system of claim 11, wherein one of the one or more intersection constraints is based on laser sensor data.

15. The system of claim 11, wherein one of the one or more intersection constraints is based on global positioning system data.

16. The system of claim 11, wherein one of the one or more intersection constraints is based on odometry data.

17. The system of claim 11, further comprising the object identifier configured to identify a second object pair at a second possible intersection representing two positional points at the second possible intersection, and the constraint generator configured to generate an energy value based on a geometric relationship of the second object pair.

18. The system of claim 11, wherein a storage system is configured to contain positional input data for a second bounded area to be analyzed, and wherein the trajectory system identifies trajectories in the first and second bounded areas that are non-overlapping.

19. The system of claim 18, wherein the storage system is configured to contain positional input data for a third bounded area to be analyzed, wherein the trajectory system identifies trajectories in the first, second, and third bounded areas are non-overlapping, and wherein the third bounded area is not adjacent to the first bounded area.

20. The system of claim 11, further comprising a vehicle configured to collect positional input data.

* * * * *